Nov. 26, 1929.  W. D. HENDERSON  1,737,046
CLAMPING TOOL
Filed Aug. 22, 1928
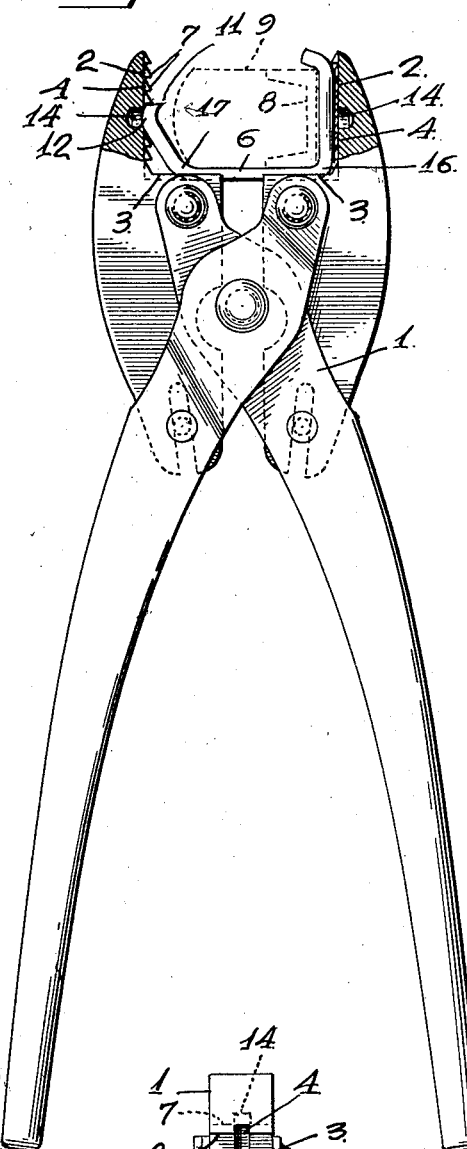
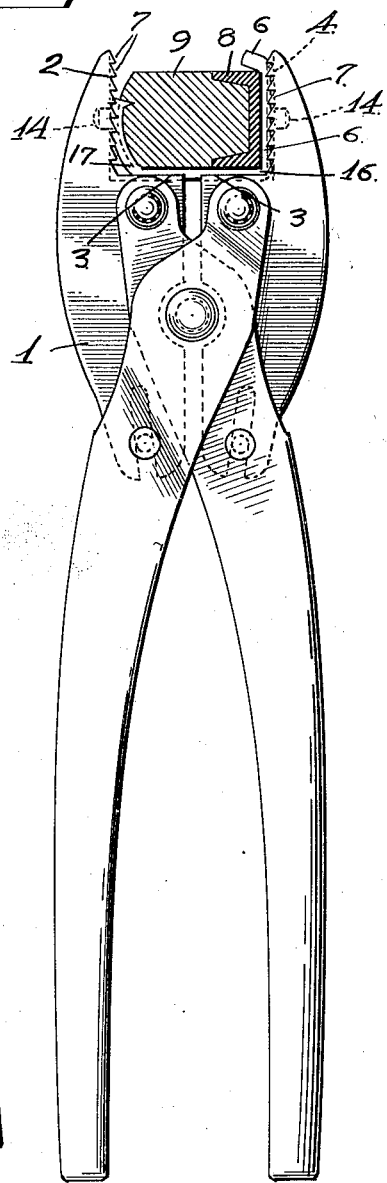
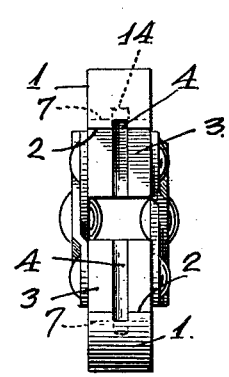
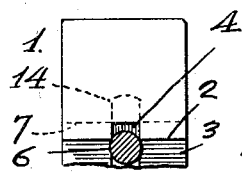
INVENTOR
WILBERT D. HENDERSON.
BY Arthur L. Slee.
ATTY.

Patented Nov. 26, 1929

1,737,046

UNITED STATES PATENT OFFICE

WILBERT D. HENDERSON, OF SAN FRANCISCO, CALIFORNIA

CLAMPING TOOL

Application filed August 22, 1928. Serial No. 301,363.

My invention relates to improvements in clamping tools of the type disclosed in United States Letters Patent numbered 1,128,681, issued to me on the 16th day of February, 1915, reference to which patent is hereby made.

The patent referred to, discloses a clamping tool in the form of a pair of pliers in which the jaws are provided with a pair of parallel working surfaces or faces, each of which has a flat working surface arranged at right angles thereto, the two latter faces being in the same plane, and all of said faces are provided with a V-shaped groove to engage and hold a clamp and apply the same to a studding channel and a wooden moulding seated therein, said pliers or clamp being also provided with means for moving the jaws and working faces thereon parallel to each other when applying said clamp.

Experience has demonstrated that the V-shaped grooves of said clamp do not effectively retain the clamp while being applied to the channel and moulding and to remedy this inefficiency I have devised the improvement of the present invention which consists in providing square or rectangular grooves of slightly less width than the diameter of the body of the clamp to be applied, whereby said clamp may be tightly gripped by the edges of said groove.

I have also found that, due to a new wearing surface being applied to the edge of the grooves with the application of each new clamp, that said edges in time become slightly worn so that they do not always grip the body of the clamp with the same efficiency. To offset this inefficiency I have provided recesses within the grooves of the parallel jaws or working surfaces, either one of which will engage a shoulder of an open clamp, and thereby further retain said clamp within the jaws of the clamping tool while being applied.

The primary object, then, of the present invention, is to provide a new and improved clamping tool for applying a clamp to a studding channel and a moulding seated therein.

Another object of the invention is to provide a clamping tool of the character described having grooves arranged to tightly embrace the body of a clamp whereby the same may be effectively retained while being applied;

A further object of the present invention is to provide improved means for engaging a shoulder on an open clamp to further operate to retain said open clamp within the grooves of the working faces of the clamping tool, when the grooves have become slightly worn, or to an extent that the clamp is not tightly engaged by said grooves;

A still further object, is the provision of rearwardly, or inwardly inclined teeth provided upon the working faces of the jaws of the clamping tool, where the edges of the grooves are provided with serrated edges to further engage the body of the clamp while being applied;

I accomplish these and other objects by means of the preferred form of the device disclosed in the drawings forming a part of the present application wherein like characters of reference are used to designate similar parts throughout the specification and drawings, and in which—

Fig. 1 is an elevation of my improved clamping tool, partly in section, disclosing an open clamp engaged by the working jaws;

Fig. 2 is a similar view disclosing the clamping tool in a closed position and the clamp closed upon a channel and wooden moulding seated therein;

Fig. 3 is a top end view of the clamping tool disclosing the rectangular grooves within the working faces; and Fig. 4 is an enlarged broken detailed view of a portion of one of the jaws, disclosing the manner in which the body of the clamp is rigidly engaged by a groove.

Referring to the drawings; the numeral 1 is used to designate in general a clamping tool of the type disclosed in the prior patent hereinabove referred to for a disclosure of the operation of said clamping tool. In the present invention the parallel jaws or working faces 2, as well as the aligned faces 3, arranged at right angles to the faces 2, are provided with preferably centrally disposed longitudinal rectangular grooves 4, the width of said grooves being slightly less than the diameter of the body of a wire clamp 6 seated within said groove, as disclosed in Fig. 4 of the drawings. Preferably the depth of said groove is slightly greater than the radius of the body of said wire clamp, so that when the edges of said groove 4 become worn through constant usage, said body of the wire clamp 6 may be seated within said groove 4 and be thereby still effectively retained.

To provide further improved facilities, in combination with the clamping tool, for further effectively engaging and retaining the wire clamp 6 after the edges of the grooves 4 become worn through constant usage, I have provided the transversely arranged and rearwardly or inwardly inclined teeth 7 intercepting the grooves 4 whereby serrated edges with rearwardly inclined points may be provided to grip the sides of the body of the wire clamp 6 when placed therein and during the operation of pressing or clamping said clamp 6 onto the channel 8 and wooden moulding 9 seated therein.

The wire clamps 6, when open and before being applied by the clamping tool 1, are provided with prongs 11 and to provide these prongs 11 the said wire clamp 6 is bent adjacent said prongs 11 and thereby provides shoulders 12. In order to provide further improved facilities for retaining said wire clamp in operative position within the grooves 4 of the clamping tool 1, I have provided recesses 14 within the bottom surfaces of the opposed grooves 4 on the parallel working faces 2 of the clamping tool 1, so that either one of these recesses 14 will engage the shoulder 12 of the wire clamp 6 placed therein, when the grooves 4 have become worn to such an extent that the body of the clamp 6 may easily move fully into said groove 4.

The wire clamp 6 is shaped with a second corner or shoulder 16 which embraces one corner of the channel 8 and is also seated within the right angle of the faces on the jaw opposite the jaw with the engaging recess 14 so that pressure of the jaws toward each other will cause the wire clamp 6 to bend at the desired point 17 when being applied.

In operation the jaws are extended and the wire clamp 6 is seated within the grooves 4 with the shoulder 12 of the clamp 6 positioned directly opposite one of the recesses 14 as disclosed in Fig. 1 of the drawings.

As the jaws of the clamping tool 1 are closed the body of the wire clamp 6 is moved firmly into the grooves 4 and the serrated edges of said teeth, as formed by the rearwardly inclined teeth 7 also impinge against the body of said wire clamp and securely hold the same in position until the jaws of said clamping tool 1 bend the wire clamp 6 as at 17 and thereby firmly close said clamp 6 around the channel 8 and wooden moulding 9 seated therein.

As a new wearing surface is presented to the edges of the grooves 4 each time a new wire clamp 6 is inserted, it is quite obvious that said groove edges will become worn as well as the points of the serrations on the edges of said groove. When this occurs the resulting enlargement or increase in the width of the grooves 4 will permit the body of the wire clamp 6 to be seated more deeply within said grooves 4 in which case the shoulder 12 of the clamp 6 will be sufficiently seated within the adjacent recess 14 which, acting in conjunction with the right-angled corner between the working faces 2 and 3 of the adjacent jaw, within which the corner 16 of the clamp is seated, will tend to firmly hold said clamp in position within the clamping tool 1 until it is firmly clamped into engaging relation with the channel 8 and moulding 9 seated therein.

Having thus described my invention what I claim as new and desire to secure by Letters Patent is—

1. A clamping tool of the character described comprising the combination with two jaws each having two straight working faces arranged at right angles to each other, two of said working faces of said respective jaws being in parallel spaced relation and the remaining two faces in the same plane, of rectangular grooves arranged in a common plane in said working faces, the width of said grooves being slightly less than the diameter of the body of an open clamp to be applied by said tool, whereby said clamp may be gripped by said rectangular grooves to prevent slipping; and recesses formed within the inner surfaces of the parallel grooves whereby either one of said recesses may engage a shoulder on said open clamp to retain said clamp within said grooves after said grooves have become worn through usage.

2. A clamping tool of the character described comprising the combination with two jaws each having two straight working faces arranged at right angles to each other, two of said working faces of said respective jaws being in parallel spaced relation and the remaining two faces in the same plane, of rectangular grooves arranged in a common plane in said working faces, the width of said grooves being slightly less than the diameter of the body of an open clamp to be applied by said tool, whereby said clamp may be gripped by said rectangular grooves to prevent slipping; and transversely arranged teeth cut across the parallel working faces to provide serrated edges on said groove to engage the body of said clamp to prevent slipping of the same within said grooves.

3. A clamping tool of the character described comprising the combination with two jaws each having two straight working faces arranged at right angles to each other, two of said working faces of said respective jaws being in parallel spaced relation and the remaining two faces in the same plane, of rectangular grooves arranged in a common plane in said working faces, the width of said grooves being slightly less than the diameter of the body of an open clamp to be applied by said tool, whereby said clamp may be gripped by said rectangular grooves to prevent slipping; and rearwardly inclined teeth cut across the parallel working faces to provide rearwardly inclined serrations on the edges of said grooves to grip the body of said clamp and thereby prevent slipping of the same.

In witness whereof, I hereunto set my signature.

WILBERT D. HENDERSON.